(12) United States Patent
Madan et al.

(10) Patent No.: US 10,831,391 B2
(45) Date of Patent: Nov. 10, 2020

(54) METHOD TO SERVE RESTORES FROM REMOTE HIGH-LATENCY TIERS BY READING AVAILABLE DATA FROM A LOCAL LOW-LATENCY TIER IN A DEDUPLICATION APPLIANCE

(71) Applicant: EMC IP Holding Company LLC, Hopkinton, MA (US)

(72) Inventors: Nitin Madan, Gurugram (IN); Srikant Viswanathan, Pune (IN); Kedar Godbole, Pune (IN); Kalyan C. Gunda, Bangalore (IN); Kalidas Balakrishnan, San Jose, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 92 days.

(21) Appl. No.: 15/965,306

(22) Filed: Apr. 27, 2018

(65) Prior Publication Data

US 2019/0332307 A1 Oct. 31, 2019

(51) Int. Cl.
*G06F 3/06* (2006.01)

(52) U.S. Cl.
CPC ............ *G06F 3/0647* (2013.01); *G06F 3/067* (2013.01); *G06F 3/0619* (2013.01); *G06F 3/0641* (2013.01); *G06F 3/0643* (2013.01)

(58) Field of Classification Search
None
See application file for complete search history.

(56) References Cited

U.S. PATENT DOCUMENTS

| 9,225,691 | B1* | 12/2015 | Balasubramanian ... | G06F 21/00 |
| 2005/0257055 | A1* | 11/2005 | Anderson ............... | H04W 8/22 |
| | | | | 713/170 |
| 2006/0174228 | A1* | 8/2006 | Radhakrishnan ... | G06F 9/30047 |
| | | | | 717/127 |
| 2007/0250674 | A1* | 10/2007 | Fineberg .............. | G06F 11/1451 |
| | | | | 711/162 |
| 2008/0243879 | A1* | 10/2008 | Gokhale ............. | G06F 11/1453 |
| 2008/0270436 | A1* | 10/2008 | Fineberg ............... | G06F 16/137 |
| 2010/0211745 | A1* | 8/2010 | Jeddeloh ............. | G06F 12/0862 |
| | | | | 711/137 |
| 2011/0113199 | A1* | 5/2011 | Tang ................... | G06F 12/0862 |
| | | | | 711/130 |
| 2013/0018851 | A1* | 1/2013 | Jayaraman ............ | G06F 3/0641 |
| | | | | 707/692 |

(Continued)

*Primary Examiner* — William E. Baughman
(74) *Attorney, Agent, or Firm* — Womble Bond Dickinson (US) LLP (57) ABSTRACT

Embodiments are described for performing file restores from remote high-latency storage tiers by reading available data from a local low-latency tier in a deduplication appliance. A request to restore a previously segmented and deduplicated file can be received by a storage appliance from an application, each segment having a fingerprint. The name of the file can be looked up in an index on the storage appliance, and a first batch of fingerprints of segments of the file can be retrieved from the index. Each fingerprint can be looked up in metadata in the index to determine whether the segment corresponding to the fingerprint is available locally and therefore need not be retrieved locally. A list of local and remote prefetch segments is generated, and a prefetch request is generated for each list, if non-empty. Use of the prefetch scheme can be dynamically turned on or off.

18 Claims, 7 Drawing Sheets

(56) References Cited

U.S. PATENT DOCUMENTS

| | | | |
|---|---|---|---|
| 2014/0006354 A1* | 1/2014 | Parkison | G06F 3/0611 707/649 |
| 2014/0006465 A1* | 1/2014 | Davis | G06F 16/182 707/827 |
| 2014/0258244 A1* | 9/2014 | Rao | G06F 16/1752 707/692 |
| 2015/0019817 A1* | 1/2015 | Akirav | G06F 12/0848 711/129 |
| 2015/0142756 A1* | 5/2015 | Watkins | G06F 16/182 707/692 |

* cited by examiner

METHOD TO SERVE RESTORES FROM REMOTE HIGH-LATENCY TIERS BY READING AVAILABLE DATA FROM A LOCAL LOW-LATENCY TIER IN A DEDUPLICATION APPLIANCE

TECHNICAL FIELD

This disclosure relates to the field of restoring segmented, deduplicated files to a storage appliance from remote and/or local file locations.

BACKGROUND

Storage systems may support multiple tiers of storage such as a local tier and a remote tier. The local tier typically has low latencies as compared to the remote tier. Ingest of files would initially occur on the low-latency local tier. Older files which need to be retained for a longer period of time, and which are not expected to be accessed again soon, may be migrated to the high-latency remote tier. When files migrated to the remote tier need to be restored by the backup application, there are two options: either first "recall" them to the local tier and then restore them, or, restore them by directly reading off the remote tier.

The "recall" approach has certain limitations. First of all, the application needs to be aware of the location of a file. Further, if we recall many large files with only the purpose of reading them once, we temporarily and unnecessarily increase the space consumption on the local tier. Finally, once the files have been read and there is no further need to access them immediately, they need to be moved back to the remote tier. On a storage appliance, such as the EMC® Data Domain® appliance, the recall approach has one advantage: that it is bandwidth-optimized.

On the other hand, the "direct restore" approach enables an application to read remote files without first recalling them. Unlike the recall-based approach, these direct reads do not consume any additional space on the local tier, and file data continues to reside on the remote tier. This approach also enables non-integrated applications (which cannot determine the location of a file), to be able to read off the remote tier. The "direct restore" approach also has its own set of limitations. First, the potentially large, remote tier latency is now directly exposed to the application and this may cause application timeouts. Second, on the backup appliance like Data Domain®, a direct restore, unlike recall, is not bandwidth-optimized and all of the requested data will be read from the remote tier. In other words, recall is careful to fetch only data that is not present on the local tier from the remote tier, while a direct restore fetches all of the data from the remote tier irrespective of what is present on the local tier. Third, direct restores may increase the bill for a customer as compared to recalls since there may be a cost associated with reading data off the remote tier—for example, if the remote tier is a cloud tier, then each read bears a cost.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following detailed description of embodiments, reference is made to the accompanying drawings in which like references indicate similar elements, and in which is shown by way of illustration manners in which specific embodiments may be practiced. These embodiments are described in sufficient detail to enable those skilled in the art to practice the invention, and it is to be understood that other embodiments may be utilized and that logical, mechanical, electrical, functional and other changes may be made without departing from the scope of the present disclosure. The following detailed description is, therefore, not to be taken in a limiting sense, and the scope of the present invention is defined only by the appended claims.

Embodiments are described for serving restores from a remote high-latency tier of storage by reading available data from a local low-latency storage tier of a deduplication appliance includes receiving a request from an application to restore a file. The file has been previously segmented into a plurality of "chunks" or segments, and each segment has been stored. A fingerprint is generated for the segment using, e.g., a hash function such as SHA-1. Metadata in an index on the storage appliance tracks where the file is currently located, such as on a remote tier of storage. Some of the segments may also reside on the storage appliance. In response to the storage appliance receiving the request to restore a file to the storage appliance, the storage appliance determines a tier of storage where all segments of the file are stored. The storage appliance retrieves a first plurality ("batch") of fingerprints of segments of the file, each fingerprint identifying a segment of the file. For each fingerprint, the storage appliance accesses an index to determine whether the segment associated with the fingerprint is stored on the storage appliance. The storage appliance prefetches the segments of the file associated with the each fingerprint in the batch of fingerprints. At least one of the segments is prefetched from the storage appliance and at least one segment is prefetched from the tier of storage where all segments of the file are stored. In an embodiment, the tier of storage where all deduplicated segments of the file are located is distinct from the storage appliance. The tier of storage where all segments of the file are located can be a remote tier of storage, such as a cloud storage. In an embodiment, the request to restore the file can originate from an application in the context of a storage appliance input/output (I/O) operation from the application. In an embodiment, the prefetched segments are read and provided to an application that requested that the file be restored. The retrieved batch of fingerprints are ordered in a file order of the prefetched segments.

Any of the above methods can be embodied on a non-transitory computer-readable medium programmed with executable instructions that, when executed, perform the method. A system can be programmed with executable instructions that, when executed by a processing system that includes at least one hardware processor, can perform any of the above methods.

Some embodiments include one or more application programming interfaces (APIs) in an environment with calling program code interacting with other program code being called through the one or more interfaces. Various function calls, messages or other types of invocations, which further may include various kinds of parameters, can be transferred via the APIs between the calling program and the code being called. In addition, an API may provide the calling program code the ability to use data types or classes defined in the API and implemented in the called program code. At least certain embodiments include an environment with a calling software component interacting with a called software component through an API. A method for operating through an API in this environment includes transferring one or more function calls, messages, other types of invocations or parameters via the API.

Figure 1:
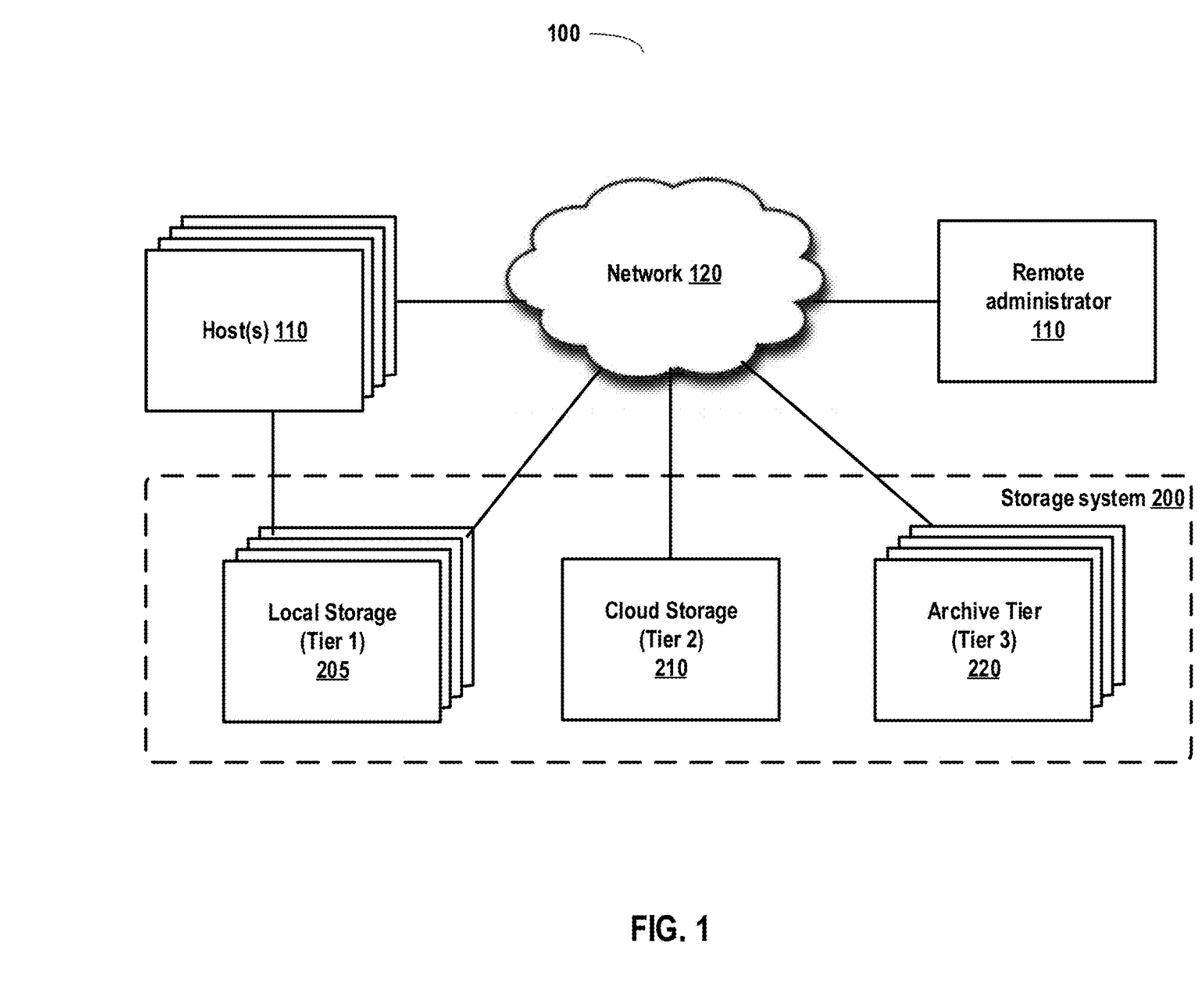
FIG. 1 illustrates, in block diagram form, an overview of a computing infrastructure that can serve restores from remote high-latency tiers by reading available data from a local low-latency tier in a deduplication storage appliance, in accordance with some embodiments.

FIG. 1 illustrates, in block diagram form, an overview of a computing infrastructure 100 that can serve restores from remote high-latency tiers by reading available data from a local low-latency tier in a deduplication storage appliance, in accordance with some embodiments.

A multi-tier storage system 200 (or, just "storage system") can include an active storage tier 205 (e.g., Tier 1), a cloud storage tier 210 (e.g., Tier 2), an archive storage tier 220 (e.g., Tier 3), or other storage tier. One or more of active storage 205, cloud storage 210, or archive storage 220 can include a multi-tier namespace of a file system, containing entries that reference files and/or directories stored across the multiple tiers of storage system 200. In an embodiment, the active storage tier 205 can include the multi-tier storage 200 namespace. The multi-tier storage 200 namespace can comprise filenames of, e.g., a single user's files, across all tiers of storage for the single user. In an embodiment, the multi-tier name space can represent a storage system 200 namespace for a business entity, and the multi-tier storage 200 namespace can include filenames and directories of the business entity across multiple tiers of storage system 200. In an embodiment, the various storage tiers of storage system 200 can be interconnected via a network 120.

Network 120 may be any type of network such as a local area network (LAN), a wide area network (WAN) such as the Internet, a fiber network, a storage network, or a combination thereof, wired or wireless. Active storage tier 205 can include a large plurality of namespaces for a large plurality of hosts 200. Each of the large plurality of namespaces can span multiple tiers of storage in the storage system 200. Each namespace of active storage tier 205 can be linked under an umbrella tree (u-tree). In an embodiment, there can be plurality of u-trees on active storage 205, each having a plurality of namespace trees under it, each namespace tree storing one or more namespaces that each span the multiple tiers of storage system 200.

Host(s) 110 may be any type of clients such as a host or server, a personal computer (e.g., desktops, laptops, and tablets), a "thin" client, a personal digital assistant (PDA), a Web enabled appliance, or a mobile phone (e.g., Smartphone), etc.

Host 110 can store, delete, rename, move, or access files in any other of the tiers of storage system 200. In an embodiment, a virtual machine on a host 110 can include one or more virtual disks that map to one or more physical disk drives of a storage tier in storage system 200. In an embodiment, the one or more physical disk drives can be located within active storage 205. In an embodiment, active storage 205 can comprise a storage appliance 205, such as a network attached storage (NAS) appliance 205. A storage appliance 205 can include a large number of disks, such as EMC® VMAX 400K with up to 5,760 hard drives. In an embodiment, a storage appliance 205 can comprise a deduplication storage system, such as EMC® Data Domain® storage systems, having a storage capacity of over 100 petabytes (PB). In an embodiment, one or more storage appliances 205 can form a part of a host 110 as an active storage 205. In an embodiment, a virtual disk can be a raw virtual disk mapped to a one or more portions of storage. A portion of storage can comprise one or more logical unit numbers (LUNs) of a single physical disk or one or more physical disks in a storage appliance 205. In an embodiment, a raw disk can be configured to use virtual mapping to one or portions of storage, such that the portions of storage can be snapshot before a backup. In an embodiment, a raw virtual disk can be physically mapped to one or more portions of storage.

Figure 2:
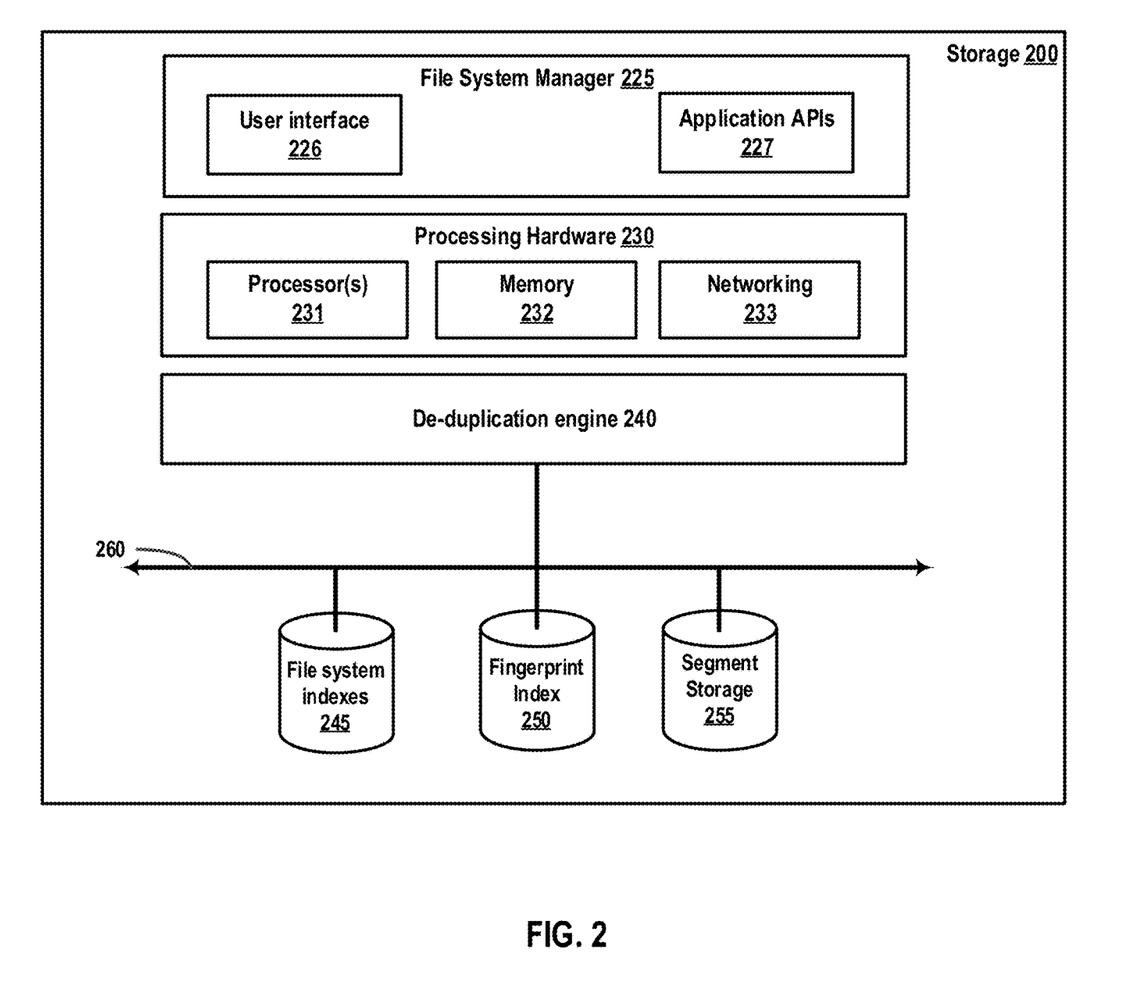
FIG. 2 illustrates, in block diagram form, components of a deduplication storage appliance that can implement serving of restores from remote high-latency tiers by reading available data from a local low-latency tier, in accordance with some embodiments.

FIG. 2 illustrates, in block diagram form, components of a deduplication storage appliance 200 that can implement serving of restores from remote high-latency tiers by reading available data from a local low-latency tier, in accordance with some embodiments. Storage system tiers 205, 210, and 220 can each have internal components as described below, generically, for storage 200.

Storage 200 can receive and process file system commands for operations such as read, write, rename, delete, move, check disk quota(s), and other file system commands. An storage 200 can include a file system manager 225, processing hardware 230, and storage unit(s) including file system indexes 245, fingerprint index 250, and segment storage containers 255. File system indexes 245 can include a namespace index for each file system that can contain metadata, including metadata identifying a location or tier of storage, where a file in the file system is stored. Fingerprint index can store a fingerprint of each segment of a file of the file system. Some segments of a file that has been moved to a low-cost storage may also reside on the storage appliance 200. The fingerprints index 250 can be used to store metadata that indicates whether a deduplicated segment associated with the fingerprint is stored locally on the storage appliance 200 or remotely in another storage tier. Segment storage 255 can storage segments of deduplicated files. Storage units 245, 250, and 255 can be interconnected to processing hardware 230 via a network 260.

File system manger 225 can manage a large plurality of namespaces and associated data for multiple tiers of storage in storage system 200. File system manager 225 can include a user interface 226 that can be used by hosts 110 and remote administrator systems 110 to issue one or more commands to perform a file system operation. File system operations can include backup, restore, read, write, rename, delete, move, or other file system operation. In an embodiment, a file system operation can be a tier-specific file system operation, meaning that the operation is directed to a specified tier of the multi-tier storage system 200.

User interface 226 of file system manager 225 can send and receive file system 200 commands containing file system 200 operations and optionally a specified tier of storage. Command format can be ASCII text, binary, encoded, encrypted, bit-mapped, or other form of command format. Application programming interface(s) (APIs) 227 can be called by applications to request file system functionality, including restore logic as described herein. A representative API is described below with reference to FIG. 6.

Processing hardware 230 can include one or more processor(s) 231, memory 232, and networking components 233, interconnected via a network, or other hardware. Processor(s) 231 can be general purpose processor(s), arithmetic coprocessors, application specific processors, programmable logic units, or other hardware processor. Memory can include read-only memory (ROM), random access memory (RAM), flash memory, non-volatile memory such as 3DXP (3D cross-point), battery backed RAM, or other memory. Memory 232 can be programmed with, or have access to, one or more executable programs that implement file system manager 252, user interface 251, networking protocols, file and storage device protocols, device drivers, and other computing system logic. Networking 233 can include one or more network interfaces, protocol stacks, interconnections, and other networking hardware.

Storage 200 can further include one or more of storage unit(s) 245, 250, and 255. Storage unit(s) 245, 250, and 255 can be interconnected with processing hardware 230 via network or bus 260 ("bus"). Bus 260 can comprise a backplane that receives an interface to storage unit(s) 245, 250, and 255, memory 232, and networking 233.

Storage units 245, 250, and 255 can include disk drives, flash drives, a RAID array, compact disk read-only memory (CD-ROM), digital video disk read-only memory (DVD-ROM), tape drives, battery-backed random access memory (RAM), or other storage unit type.

A representative computing device for storage 200 can be a computing system as described below with reference to FIG. 7.

Figure 3:
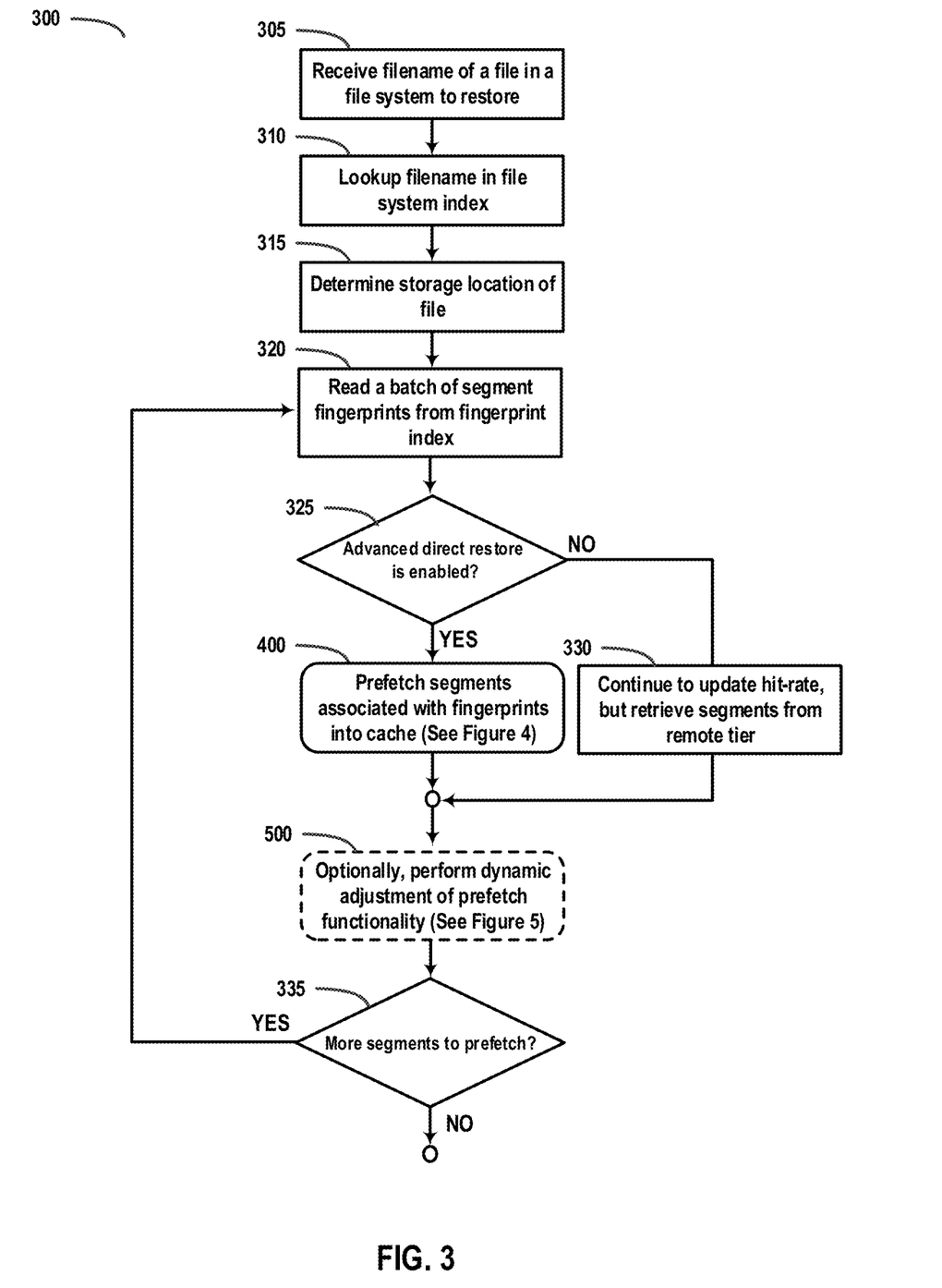
FIG. 3 illustrates, in block diagram form, method of serving restores from remote high-latency tiers by reading available data from a local low-latency tier, in accordance with some embodiments.

FIG. 3 illustrates, in block diagram form, method 300 of serving restores from remote high-latency tiers by reading available data from a local low-latency tier, in accordance with some embodiments.

In operation 305, storage appliance 205 can receive an I/O request from an application to restore a file that was previously segmented into "chunks," deduplicated, and stored in a storage, such as remote tier 210. Storage appliance 205 maintains a file system index of the namespace of files in a file system, along with metadata describing where the file is located, e.g. remote tier 210. Some segments of the file may be located on the storage appliance 205. All segments of the file to be restored may be on, e.g., remote storage 210.

In operation 310, storage appliance 205 can look up the filename of the file to be restored in an index on storage appliance 205.

In operation 315, storage appliance can determine the tier of storage where all segments of the file to be restored are located.

In operation 320, storage appliance can access metadata in an index on storage appliance 205 to read a first plurality (or "batch") of fingerprints of segments of the file to be restored. Each fingerprint in the first plurality of fingerprints has metadata that indicates whether the segment associated with the fingerprint is stored on storage appliance 205, or on another tier of storage, such as Tier 2 (210) or Tier 3 (215).

In operation 325, it can be determined whether advanced direct restore from a remote tier by prefetching of segments from local tier storage appliance 205 is enabled. If so, then method 300 continues at operation 400. Otherwise method 400 continues at operation 330.

In operation 330, a hit-rate can be determined of fingerprints corresponding to segments found on storage appliance 205 vs. segments that are located on a remote storage tier. Method 400 continues at operation 500.

In operation 400, it has been determined that prefetch of segments is enabled, and the plurality of fingerprints can be processed to prefetch each segment associated with each fingerprint. Operation 400 is described in more detail, below, with reference to FIG. 4.

In operation 500, dynamic adjustment of the prefetch functionality can optionally be performed, to determine whether prefetch of segments from the storage appliance 205 should continue or be disabled. Operation 500 is described in detail, below, with reference to FIG. 5.

In operation 335, it can be determined whether there are more fingerprints in the index on the storage appliance 205 corresponding to more segments of the file to process. If so, then method 300 continues at operation 320. Otherwise, method 300 ends.

Figure 4:
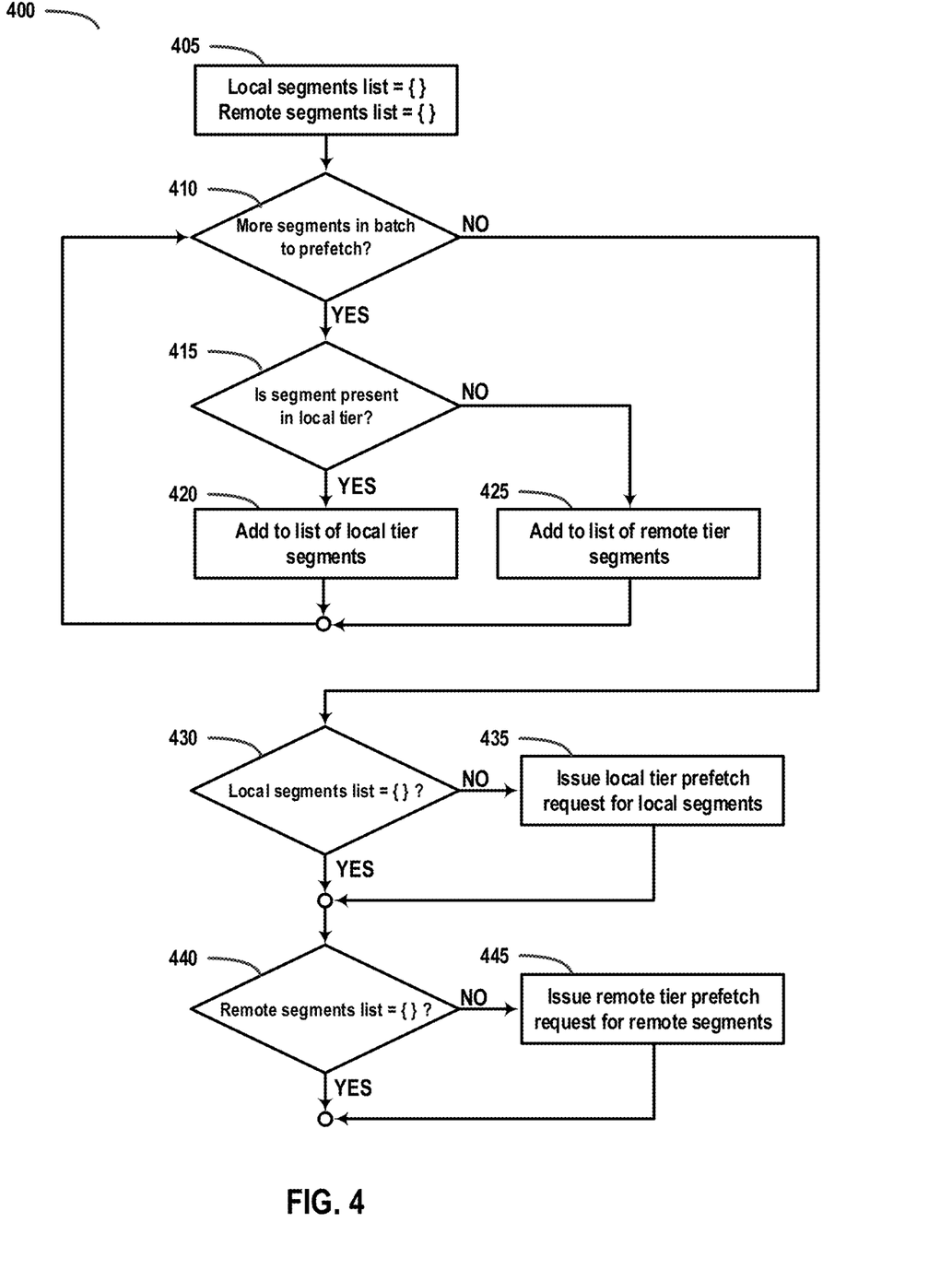
FIG. 4 illustrates, in block diagram form, a method of prefetching segments of data to implement serving restores from remote high-latency storage tiers by reading available data from a local low-latency tier, in accordance with some embodiments.

FIG. 4 illustrates, in block diagram form, a method 400 of prefetching segments of data to implement serving restores from remote high-latency storage tiers by reading available data from a local low-latency tier, in accordance with some embodiments.

In operation 405, a variable "local segments list" can be initialized to the empty set, "{ }". A variable "remote segments list" can be initialized to the empty set, "{ }". The local segments list is a list of segments of the file to be restored that are determined to be located on the storage appliance 205. The variable "remote segments list" is a list of segments of the file that are determined to be stored on a remote tier of storage. In an embodiment, the local segments list and remote segments list are re-initialized each time method 400 is called to process a batch of fingerprints read from the index file on the storage appliance 205.

In operation 410, it can be determined whether there are more segments in the batch of fingerprints to process. If so, then method 400 continues at operation 415. Otherwise method 400 continues at operation 430.

In operation 415, it can be determined whether a next fingerprint in the plurality ("batch") of fingerprints corresponds to a segment that is located in the local tier, storage appliance 205. Storage appliance 205 can use metadata associated with the fingerprint to determine whether the segment of the file associated with the fingerprint is located on storage appliance 205 ("local tier") or on a remote tier. If the segment is present on the local tier, then in operation 420, the segment, or fingerprint of the segment, is added to the local segments list of segments that will be prefetched from the storage appliance 205. Otherwise, in operation 425, the segment, or fingerprint of the segment, is added to the remote segments list of segments that will be prefetched from the remote storage 210 or 215 where all segments of the file are located.

In operation 430, it can be determined whether the local segments list is the empty set, "{ }". If so, then for this plurality ("batch") of fingerprints, no segments of the file were found on the storage appliance 205 and method 400 continues at operation 440. If the local segments list is not the empty set, then in operation 435, storage appliance 205 can issue a prefetch request for the segments listed in the local segments list. In an embodiment, the prefetch can use the fingerprint corresponding to the segment to prefetch the segment.

In operation 440, it can be determined whether the remote segments list is the empty set, "{ }". If so, then for this plurality ("batch") of fingerprints, no segments of the file were found on the remote storage 210 or 215 and method 400 ends. If the remote segments list is not the empty set, then in operation 445, storage appliance 205 can issue a prefetch request for the segments listed in the remote segments list to the remote storage tier where all segments of the file to be restored are stored. In an embodiment, the prefetch can use the fingerprint corresponding to the segment to prefetch the segment.

Figure 5:
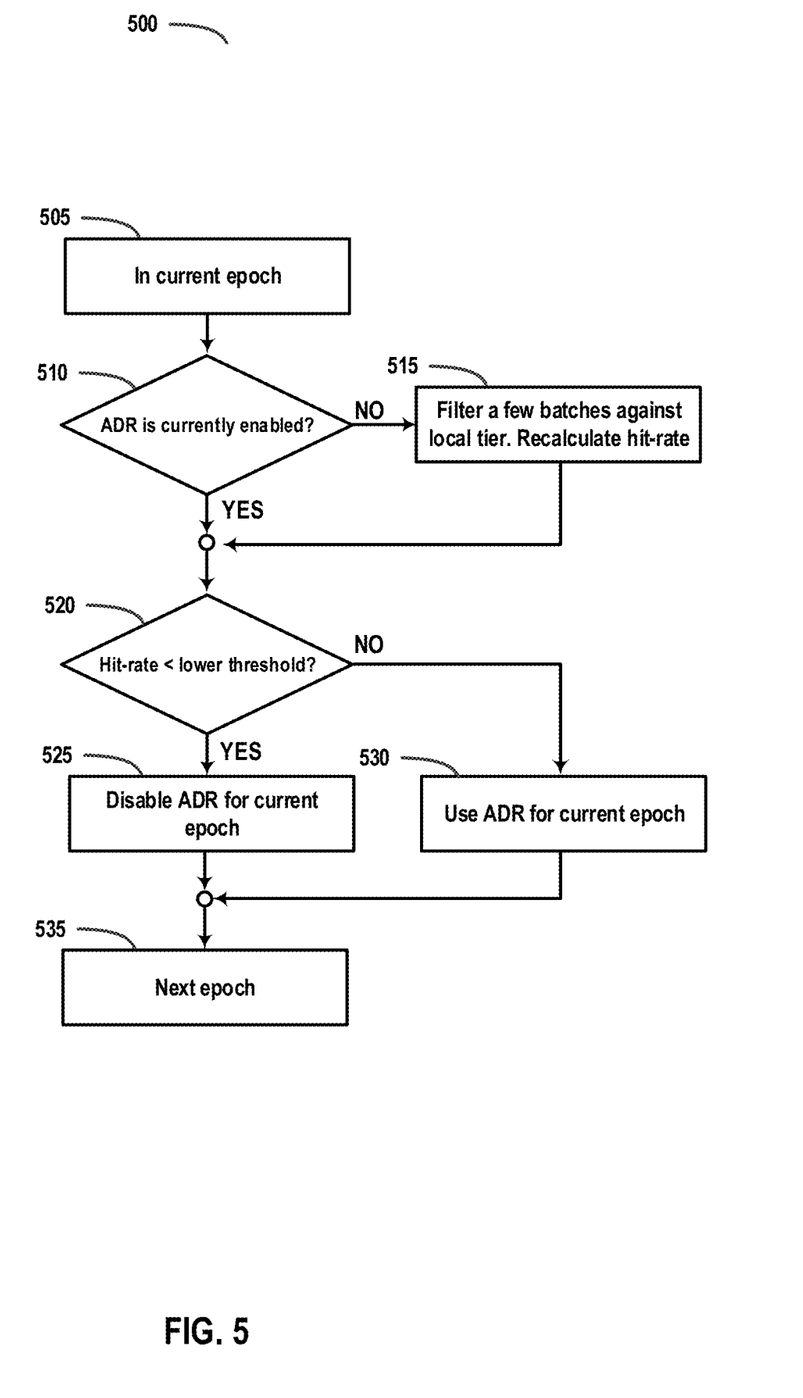
FIG. 5 illustrates, in block diagram form, a method of dynamically adjusting behavior of a method of serving restores from remote high-latency tiers by reading available data from a local low-latency tier, in accordance with some embodiments.

FIG. 5 illustrates, in block diagram form, a method 500 of dynamically adjusting behavior of a method of serving restores from remote high-latency tiers by reading available data from a local low-latency tier, in accordance with some embodiments. The method of serving restores can be termed, "advanced direct restores," or "ADR".

Looking up the local-tier index to determine if a segment resides locally has a cost associated with it in terms of CPU cycles, memory consumption and disk JO. The index would be typically large and would not reside entirely in memory. Looking up a segment in the index may first involve loading the index in memory which is an JO operation. If the file being restored from the remote tier has a small fraction of its data on the local tier, then local-tier index lookups are an unnecessary overhead that we would like to avoid for such files. This is achieved by monitoring the hit-rate on the local tier during the advanced restore (ADR) operation, and dynamically turning the advanced restore mechanism on or off depending on the current hit-rate.

Certain regions of the file may have a lot of data in common with the local tier, while other regions may not. During the course of an advanced restore from the remote tier, the ADR mechanism may turn itself on and off several times depending upon the commonality of the regions of the file with respect to the local tier.

The self-tuning approach works on the concept of an "epoch." An epoch represents a fixed-size region of a file. For example, if the value of the epoch is 100 MB, then the first epoch starts from offset 0 and ends at 100 MB, second epoch starts at offset 100 MB and ends at 200 MB and so on. A lower threshold captures the hit-rate below which advanced direct restores may be turned off. An upper threshold captures the hit-rate above which advanced direct restores may be turned on. The epoch can alternatively be determined in terms of a time interval, rather than a fixed-size region of a file.

In operation 505, the restore process is in the current epoch, as described above.

In operation 510, it can be determined whether advanced direct restores ("ADR") is enabled. When ADR is enabled, the prefetch functionality is enabled that checks the local storage to determine whether a segment associated with a fingerprint is located on the storage appliance 205, thereby avoiding a call to a remote storage to retrieve the segment. If ADR is not enabled, then method 500 continues at operation 515. Otherwise method 500 continues at operation 520.

In operation 515, it has been determined that ADR is disabled. A few batches of prefetch data can be sampled to determine a hit-rate of segments found on the storage appliance 205 vs. segments that had to be retrieved from remote storage. The definition of "a few" can be a predetermined number, such as 5 or 10, or can be a tunable value.

In operation 520, it can be determined whether the hit-rate of finding segments on the local tier of the file to be restored vs. misses, wherein the file segment had to be retrieved from the remote storage, is less than a lower threshold. If hit-rate is less than the lower threshold, then in operation 525 ADR is disabled for the current epoch, otherwise in operation 530 ADR is enabled for the current epoch.

In operation 535, a next epoch is processed, wherein method 500 will be invoked again.

Figure 6:
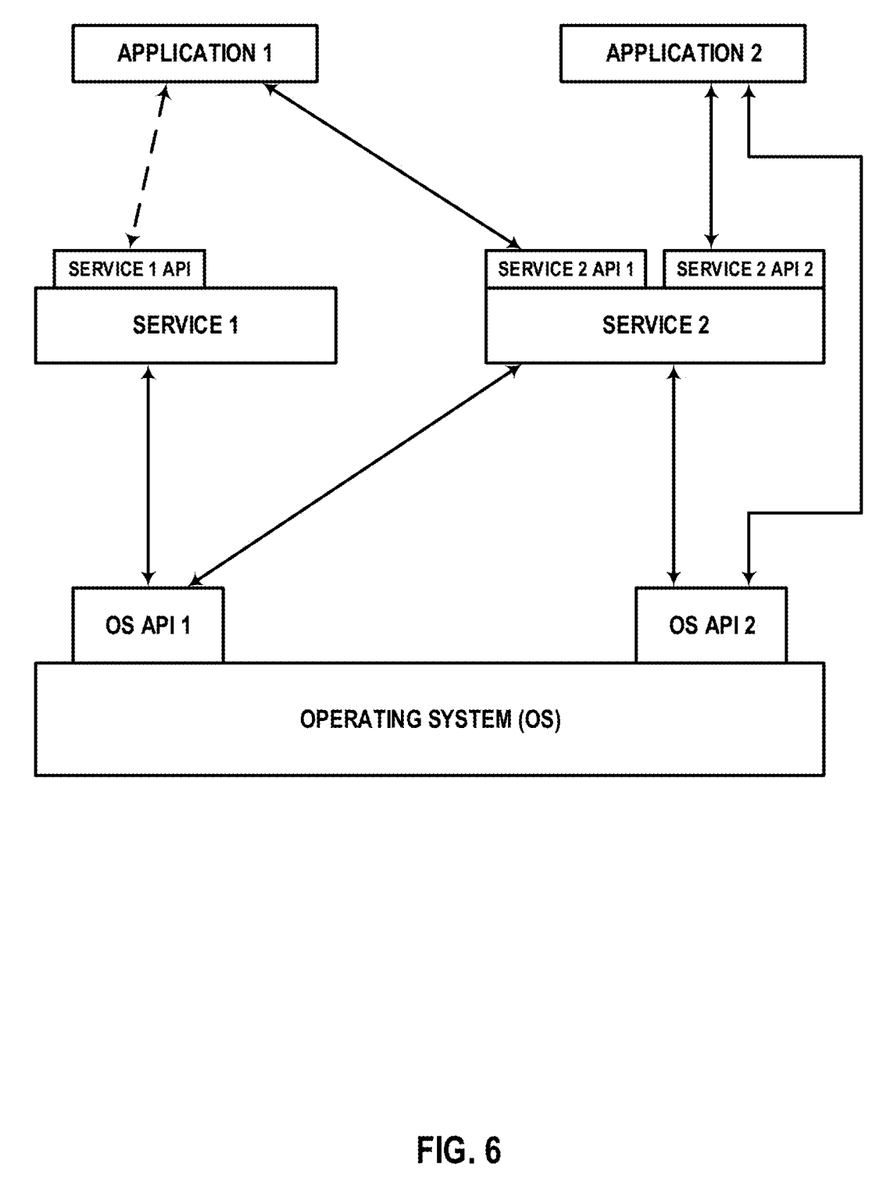
FIG. 6 illustrates an exemplary embodiment of a software stack usable in some embodiments of the invention.

In FIG. 6 ("Software Stack"), an exemplary embodiment, applications can make calls to Services 1 or 2 using several Service APIs and to Operating System (OS) using several OS APIs. Services 1 and 2 can make calls to OS using several OS APIs.

Note that the Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both as API 1 and OS API 2, Application 2 makes calls to and receives returned values from as API 2.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 7:
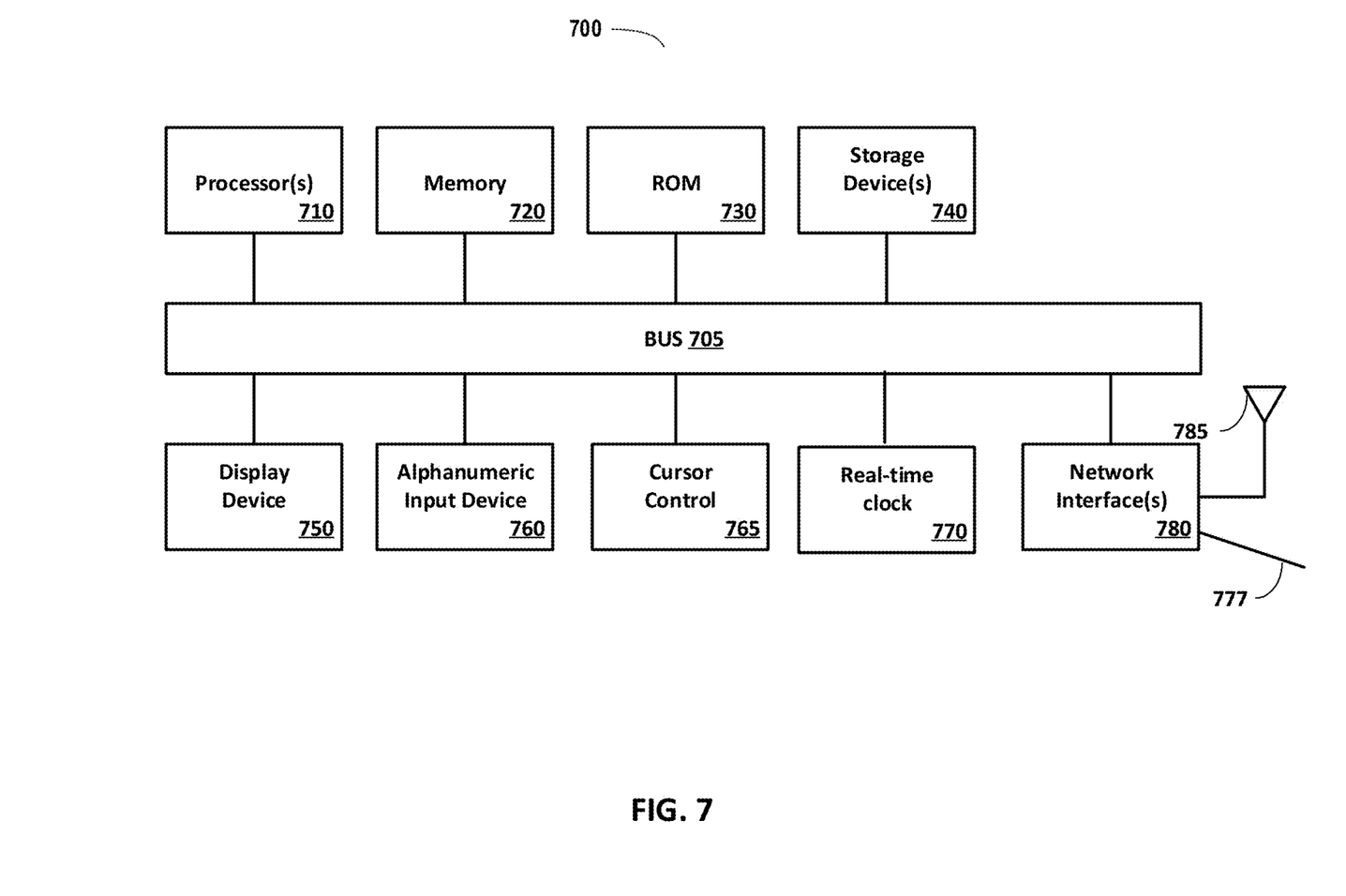
FIG. 7 illustrates, in block diagram form, an exemplary computing system for implementing concepts described herein.

FIG. 7 is a block diagram of one embodiment of a computing system 700. The computing system illustrated in FIG. 7 is intended to represent a range of computing systems (either wired or wireless) including, for example, desktop computer systems, laptop computer systems, cellular telephones, personal digital assistants (PDAs) including cellular-enabled PDAs, set top boxes, entertainment systems or other consumer electronic devices. Alternative computing systems may include more, fewer and/or different components. The computing system of FIG. 7 may be used to provide a computing device and/or a server device.

Computing system 700 includes bus 705 or other communication device to communicate information, and processor 710 coupled to bus 705 that may process information.

While computing system 700 is illustrated with a single processor, computing system 700 may include multiple processors and/or co-processors 710. Computing system 700 further may include random access memory (RAM) or other dynamic storage device 720 (referred to as main memory), coupled to bus 705 and may store information and instructions that may be executed by processor(s) 710. Main memory 720 may also be used to store temporary variables or other intermediate information during execution of instructions by processor 710.

Computing system 700 may also include read only memory (ROM) 730 and/or other static, non-transitory storage device 740 coupled to bus 705 that may store static information and instructions for processor(s) 710. Data storage device 740 may be coupled to bus 705 to store information and instructions. Data storage device 740 such as flash memory or a magnetic disk or optical disc and corresponding drive may be coupled to computing system 700.

Computing system 700 may also be coupled via bus 705 to display device 750, such as a light-emitting diode display (LED), liquid crystal display (LCD), or touch screen display to display information to a user. Computing system 700 can also include an alphanumeric input device 760, including alphanumeric and other keys, which may be coupled to bus 705 to communicate information and command selections to processor(s) 710. Another type of user input device is cursor control 765, such as a touchpad, a mouse, a trackball, or cursor direction keys to communicate direction information and command selections to processor(s) 710 and to control cursor movement on display 750. Computing system 700 may further include a real-time clock 770. The real-time clock 770 may be used for generating date/time stamps for data records, computing elapsed time, and other time-keeping functions. A real-time clock 770 can be a battery-backed chipset with a settable date and time. Alternatively, a real-time clock 770 may include logic to retrieve a real-time from a network source such as a server or an Internet server via network interfaces 780, described below.

Computing system 700 further may include one or more network interface(s) 780 to provide access to a network, such as a local area network. Network interface(s) 780 may include, for example, a wireless network interface having antenna 785, which may represent one or more antenna(e). Computing system 700 can include multiple wireless network interfaces such as a combination of WiFi, Bluetooth® and cellular telephony interfaces. Network interface(s) 780 may also include, for example, a wired network interface to communicate with remote devices via network cable 787, which may be, for example, an Ethernet cable, a coaxial cable, a fiber optic cable, a serial cable, or a parallel cable.

In one embodiment, network interface(s) 780 may provide access to a local area network, for example, by conforming to IEEE 802.11b, 802.11g, or 802.11n standards, and/or the wireless network interface may provide access to a personal area network, for example, by conforming to Bluetooth® standards. Other wireless network interfaces and/or protocols can also be supported. In addition to, or instead of, communication via wireless LAN standards, network interface(s) 780 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A computer-implemented comprising:
 receiving, by a storage appliance, a request to restore a file to the storage appliance, the file having been previously segmented into a plurality of deduplicated segments, each deduplicated segment having a fingerprint;
 determining, by the storage appliance, a tier of storage where all deduplicated segments of the requested file are stored;
 for each batch of fingerprints of a plurality of batches of fingerprints, iteratively performing:
  determining a hit-rate as a first ratio of segments associated with a previous batch of fingerprints that are stored on the storage appliance vs. stored on the tier storage;
  retrieving, from the storage appliance, the batch of fingerprints, each fingerprint in the batch of fingerprints identifying a deduplicated segment of the file;
  for each fingerprint in the batch of fingerprints, accessing an index of the storage appliance to determine where the segment associated with the fingerprint is stored;
  determining whether an advanced direct restore (ADR) was enabled or disabled for the previous batch of fingerprints;
  in response to determining that the ADR was disabled for the previous batch of fingerprints, determining the hit-rate as a second ratio of segments associated with a portion of fingerprints of the batch of fingerprints that are stored on the storage appliance vs. stored on the tier storage;
  determining whether the hit-rate is below a threshold;
  in response to determining that the hit-rate is above the threshold, enabling the ADR for the batch of fingerprints and prefetching segments associated with the batch of fingerprints by retrieving at least one segment associated with a fingerprint in the batch of fingerprints from the storage appliance and retrieving at least one other segment associated with one other fingerprint in the batch of fingerprints from the tier of storage where all segments of the file are stored; and
  in response to determining that the hit-rate is below the threshold, disabling the ADR and retrieving all of the segments associated with the batch of fingerprints from the tier of storage.

2. The method of claim 1, wherein the tier of storage where all deduplicated segments of the file are located is distinct from the storage appliance.

3. The method of claim 1, wherein all segments of the file are located on a remote tier of storage that comprises a cloud storage service.

4. The method of claim 1, wherein the request is received from an application in the context of a storage appliance input/output (I/O) operation from the application.

5. The method of claim 1, wherein the prefetched segments are read and provided to an application that requested that the file be restored.

6. The method of claim 1, wherein the batch of fingerprints are ordered in a file order of the prefetched segments.

7. A non-transitory computer-readable medium programmed with executable instructions that, when executed by a processing system having at least one hardware processor, perform operations comprising:
 receiving, by a storage appliance, a request to restore a file to the storage appliance, the file having been previously segmented into a plurality of deduplicated segments, each deduplicated segment having a fingerprint;
 determining, by the storage appliance, a tier of storage where all deduplicated segments of the requested file are stored;

for each batch of fingerprints of a plurality of batches of fingerprints, iteratively performing:
  determining a hit-rate as a first ratio of segments associated with a previous batch of fingerprints that are stored on the storage appliance vs. stored on the tier storage;
  retrieving, from the storage appliance, the batch of fingerprints, each fingerprint in the batch of fingerprints identifying a deduplicated segment of the file;
  for each fingerprint in the batch of fingerprints, accessing an index of the storage appliance to determine where the segment associated with the fingerprint is stored;
  determining whether an advanced direct restore (ADR) was enabled or disabled for the previous batch of fingerprints;
  in response to determining that the ADR was disabled for the previous batch of fingerprints, determining the hit-rate as a second ratio of segments associated with a portion of fingerprints of the batch of fingerprints that are stored on the storage appliance vs. stored on the tier storage;
  determining whether the hit-rate is below a threshold;
  in response to determining that the hit-rate is above the threshold, enabling the ADR for the batch of fingerprints and, prefetching segments associated with the batch of fingerprints by retrieving at least one segment associated with a fingerprint in the batch of fingerprints from the storage appliance and retrieving at least one other segment associated with one other fingerprint in the batch of fingerprints from the tier of storage where all segments of the file are stored; and
  in response to determining that the hit-rate is below the threshold, disabling the ADR and retrieving all of the segments associated with the batch of fingerprints from the tier of storage.

8. The medium of claim 7, wherein the tier of storage where all deduplicated segments of the file are located is distinct from the storage appliance.

9. The medium of claim 7, wherein all segments of the file are located on a remote tier of storage that comprises a cloud storage service.

10. The medium of claim 7, wherein the request is received from an application in the context of a storage appliance input/output (I/O) operation from the application.

11. The medium of claim 7, wherein the prefetched segments are read and provided to an application that requested that the file be restored.

12. The medium of claim 7, wherein the batch of fingerprints are ordered in a file order of the prefetched segments.

13. A system comprising:
  a processing system having at least one hardware processor, the processing system coupled to a memory programmed with executable instructions that, when executed by the processing system, perform operations comprising:
    receiving, by a storage appliance, a request to restore a file to the storage appliance, the file having been previously segmented into a plurality of deduplicated segments, each deduplicated segment having a fingerprint;
    determining, by the storage appliance, a tier of storage where all deduplicated segments of the requested file are stored;
    for each batch of fingerprints of a plurality of fingerprints, iteratively performing:
      determining, a hit-rate as a first ratio of segments associated with a previous batch of fingerprints that are stored on the storage appliance vs. stored on the tier storage;
      retrieving, from the storage appliance, the batch of fingerprints, each fingerprint in the batch of fingerprints identifying a deduplicated segment of the file;
      for each fingerprint in the batch of fingerprints, accessing an index of the storage appliance to determine where the segment associated with the fingerprint is stored;
      determining whether an advanced direct restore (ADR) was enabled or disabled for the previous batch of fingerprints;
      in response to determining that the ADR was disabled for the previous batch of fingerprints, determining the hit-rate as a second ratio of segments associated with a portion of the fingerprints of the batch of fingerprints that are stored on the storage appliance vs. stored on the tier storage;
      determining whether the hit-rate is below a threshold;
      in response to determining that the hit-rate is above the threshold, enabling the ADR for the batch of fingerprints and prefetching segments associated with the batch of fingerprints by retrieving at least one segment associated with a fingerprint in the batch of fingerprints from the storage appliance and retrieving at least one other segment associated with one other fingerprint in the plurality of fingerprints from the tier of storage where all segments of the file are stored; and
      in response to determining that the hit-rate is below the threshold, disabling the ADR and retrieving all of the segments associated with the batch of fingerprints from the tier storage.

14. The system of claim 13, wherein the tier of storage where all deduplicated segments of the file are located is distinct from the storage appliance.

15. The system of claim 13, wherein all segments of the file are located on a remote tier of storage that comprises a cloud storage service.

16. The system of claim 13, wherein the request is received from an application in the context of a storage appliance input/output (I/O) operation from the application.

17. The system of claim 13, wherein the prefetched segments are read and provided to an application that requested that the file be restored.

18. The system of claim 13, wherein the batch of fingerprints are ordered in a file order of the prefetched segments.

* * * * *